US011861326B1

(12) United States Patent
Singh et al.

(10) Patent No.: US 11,861,326 B1
(45) Date of Patent: Jan. 2, 2024

(54) FLOW CONTROL BETWEEN NON-VOLATILE MEMORY STORAGE AND REMOTE HOSTS OVER A FABRIC

(71) Applicant: Xilinx, Inc., San Jose, CA (US)

(72) Inventors: Santosh Singh, Hyderabad (IN); Deboleena M. Sakalley, Hyderabad (IN); Ramesh R. Subramanian, Hyderabad (IN); Pankaj V. Kumbhare, Hyderabad (IN); Ravi K. Boddu, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/092,490

(22) Filed: Apr. 6, 2016

(51) Int. Cl.
  *G06F 15/16* (2006.01)
  *G06F 5/06* (2006.01)
  *G06F 3/06* (2006.01)
  *G06F 15/173* (2006.01)

(52) U.S. Cl.
  CPC .............. *G06F 5/065* (2013.01); *G06F 3/061* (2013.01); *G06F 3/0655* (2013.01); *G06F 3/0688* (2013.01); *G06F 15/17331* (2013.01); *G06F 2205/067* (2013.01)

(58) Field of Classification Search
  CPC ........ G06F 5/065; G06F 3/061; G06F 3/0655; G06F 3/0688; G06F 15/17331; G06F 2205/067
  USPC .................................................. 709/212, 213
  See application file for complete search history.

(56) References Cited

U.S. PATENT DOCUMENTS

| 9,432,298 | B1 * | 8/2016 | Smith | H04L 49/9057 |
| 2008/0147970 | A1 * | 6/2008 | Sade | G06F 12/0873 |
| | | | | 711/E12.019 |
| 2013/0117766 | A1 * | 5/2013 | Bax | G06F 9/4405 |
| | | | | 719/323 |
| 2014/0281057 | A1 * | 9/2014 | Cohen | G06F 3/0656 |
| | | | | 710/52 |
| 2017/0286363 | A1 * | 10/2017 | Joshua | G06F 3/0688 |

OTHER PUBLICATIONS

U.S. Appl. No. 15/052,603, filed Feb. 24, 2016, Sakalley, D. et al., Xilinx, Inc., San Jose, CA USA.

* cited by examiner

*Primary Examiner* — Suraj M Joshi
*Assistant Examiner* — Joel Mesa
(74) *Attorney, Agent, or Firm* — Patterson + Sheridan, LLP

(57) ABSTRACT

An example method of flow control between remote hosts and a target system over a front-end fabric, the target system including a nonvolatile memory (NVM) subsystem coupled to a back end fabric having a different transport than the front-end fabric is described. The method includes receiving commands from the remote hosts at a controller in the target system for the NVM subsystem. The method further includes storing the commands in a first-in-first-out (FIFO) shared among the remote hosts and implemented in memory of the target system. The method further includes updating virtual submission queues for the remote hosts based on the commands stored in the FIFO. The method further includes providing the commands to the NVM subsystem from the FIFO.

20 Claims, 7 Drawing Sheets

US 11,861,326 B1

FLOW CONTROL BETWEEN NON-VOLATILE MEMORY STORAGE AND REMOTE HOSTS OVER A FABRIC

TECHNICAL FIELD

Examples of the present disclosure generally relate to electronic circuits and, in particular, to flow control between non-volatile memory storage and remote hosts over a fabric.

BACKGROUND

The popularity of sold state drives (SSDs) and exponential growth of network content has led to the emergence of all-non-volatile memory (NVM) storage systems, such as SSD arrays. The popularity of SSDs has also lead to the creation of a NVM Express® (NVMe) specification for SSDs connected to a Peripheral Component Interconnect (PCI) Express® bus referred to as "PCIe." The merger of NVMe and network-based storage systems, referred to herein as NVMe Over Fabric (NVMEoF), leads to the concept of making PCIe-based NVMe SSDs accessible via a network fabric using a remote direct memory access (RDMA) transport.

An NVMEoF system includes one or more remote hosts connected to an NVMEoF system via a network interface card (NIC) through a network fabric, such as an Ethernet fabric. On the backend side, the NVMEoF system manages multiple SSDs, each of which can be shared with multiple remote hosts. The remote hosts issue read and write commands to the NVMEoF system over the network by layering the NVMe protocol over an RDMA protocol. The NVMEoF system forwards these read and write commands to the back end SSDs based on an internal mapping. The RDMA protocol allows data exchange without actively involving central processing units (CPUs) of the remote hosts, thereby reducing CPU overhead. One technique for processing the commands is to allocate one or more queues using dedicated memory resources in an NVMEoF controller to store the commands for each remote host. However, setting aside dedicated memory resources for each remote host consumes valuable memory resources at the controller, particularly as the number of remote hosts increases.

SUMMARY

Techniques for flow control between non-volatile memory storage and remote hosts over a fabric are described. In an example, a method of flow control between remote hosts and a target system over a front-end fabric, the target system including a nonvolatile memory (NVM) subsystem coupled to a back end fabric having a different transport than the front-end fabric is described. The method includes receiving commands from the remote hosts at a controller in the target system for the NVM subsystem. The method further includes storing the commands in a first-in-first-out (FIFO) shared among the remote hosts and implemented in memory of the target system. The method further includes updating virtual submission queues for the remote hosts based on the commands stored in the FIFO. The method further includes providing the commands to the NVM subsystem from the FIFO.

In another example, an integrated circuit (IC) includes a front-end interface configured for communication with remote hosts over a front-end fabric. The IC further includes a back-end interface configured for communication with a nonvolatile memory (NVM) subsystem over a back-end fabric that uses a different transport than the front-end fabric. The IC further includes a controller coupled between the front-end interface and the back-end interface. The controller is configured to receive commands from the remote hosts for the NVM subsystem, store the commands in a first-in-first-out (FIFO) shared among the remote hosts and implemented in a memory coupled to the controller, update virtual submission queues for the remote hosts based on the commands stored in the FIFO, and provide the commands to the NVM subsystem from the FIFO.

In another example, a computer system includes a plurality of remote hosts, a front-end fabric, a target system coupled to the plurality of remote hosts through the front-end fabric and configured to communicate with the plurality of remote hosts using a remote direct memory access (RDMA) transport, and a back-end fabric. The computer further includes a nonvolatile memory (NVM) subsystem coupled to the back-end fabric and configured to communicate using a transport different than the RDMA transport and a controller disposed in the target system. The controller is configured to receive commands from the plurality of remote hosts for the NVM subsystem, store the commands in a first-in-first-out (FIFO) shared among the plurality of remote hosts and implemented in a memory coupled to the controller, update virtual submission queues for the plurality of remote hosts based on the commands stored in the FIFO, and provide the commands to the NVM subsystem from the FIFO.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
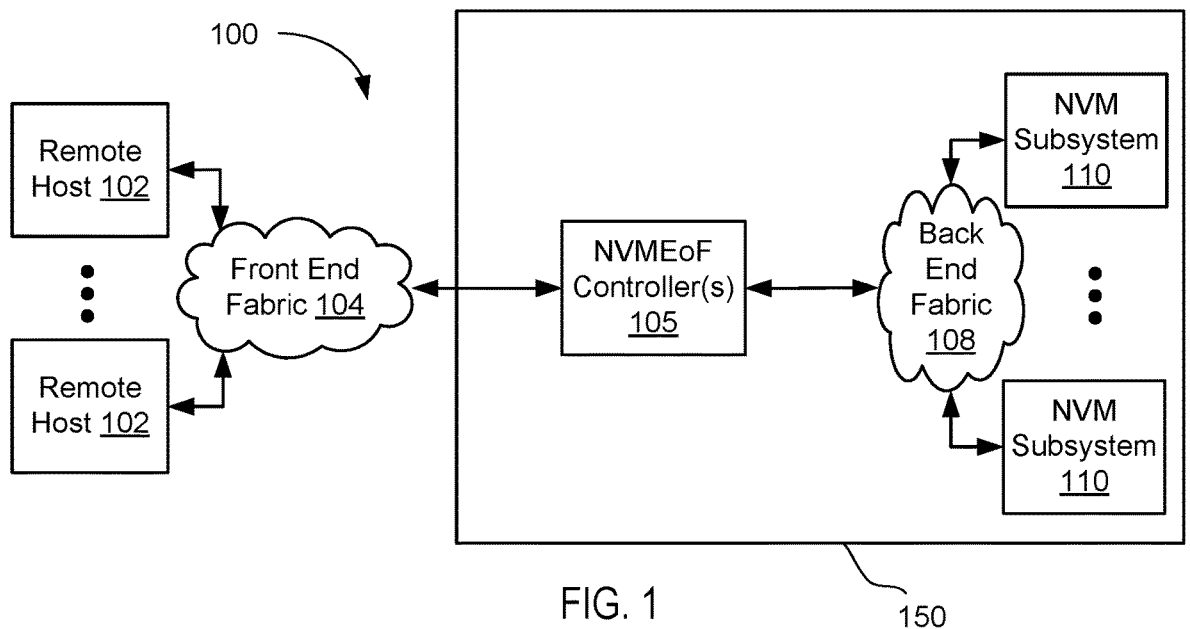
FIG. 1 is a block diagram depicting a computer system according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

Techniques for flow control between non-volatile memory storage and remote hosts over a fabric are described. The techniques described herein virtualize submission and completion queues backed by limited memory resources. In an example, the submission and completion queues are virtualized and backed by shared first-in-first-out (FIFO) that provides a combined resource pool. This technique removes the need of arbitration between the submission/completion queues as the submission/completion queue entries are processed in a first-come-first-serve basis. These and further aspects are discussed below with respect to the drawings.

FIG. 1 is a block diagram depicting a computer system 100 according to an example. The computer system 100 includes one or more remote hosts 102, a front end fabric 104, an NVMEoF controller 105 (also referred to as "controller 105"), a back end fabric 108, and one or more nonvolatile memory (NVM) subsystems 110. For purposed of clarity by example, a single NVMEoF controller 105 is described. However, it is to be understood that the computer system 100 can include a plurality of NVMEoF controllers 105.

The remote hosts 102 are coupled to the controller 105 through the front end fabric 104. The front end fabric 104 can employ an Ethernet data link layer or InfiniBand® (IB) data link layer. The remote hosts 102 can communicate with the controller 105 over the front-end fabric 104 using a remote direct memory access (RDMA) transport, such as RDMA over Converged Ethernet (RoCE), IB, Internet Wide Area RDMA (iWARP), or the like. The controller 105 is coupled to the NVM subsystems 110 through the back-end fabric 108. The back-end fabric 108 can employ a different transport than the front-end fabric 104. In an example, the back-end fabric 108 is a Peripheral Component Interconnect (PCI) Express® (PCIe) fabric. The controller 105 provides an interface between the remote hosts 102 and the NVM subsystems 110. The controller 105 is coupled to the NVM subsystems 110 through the back end fabric 108. The NVM subsystem 110 is configured to persistently store data using a NVM technology, such as solid state disk (SSD) storage technology.

In an example, the NVM subsystem 110 includes a register interface compliant with an NVM Express® (NVMe) specification, such as NVM Express rev. 1.2. The controller 105, the back-end fabric 108, and the NVM subsystems 110 are collectively referred to as a target system 150. The remote hosts 102 can issue commands targeting the target system 150 using NVMe layered over RDMA transport. The controller 105 receives the commands and provides an interface between the different transports used by the front-end and back-end fabrics 104 and 108.

Figure 2:
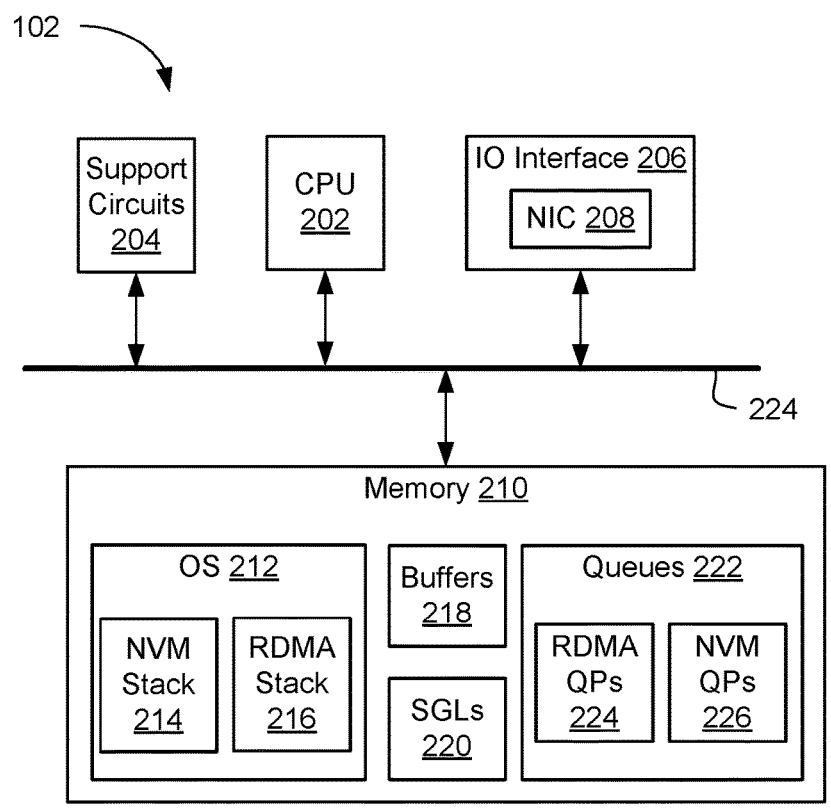
FIG. 2 is a block diagram depicting a remote host according to an example.

FIG. 2 is a block diagram depicting a remote host 102 according to an example. The remote host 102 includes a central processing unit (CPU) 202, one or more support circuits 204, an input/output (IO) interface 206, and a memory 210 coupled to a bus 224. The CPU 202 can include one or more microprocessors. The support circuits 204 can include conventional cache, power supplies, clock circuits, data registers, IO interfaces, and the like. The IO interface 206 can be coupled to various IO devices, which can include conventional keyboard, mouse, and the like. The IO interface 206 can also include a network interface card (NIC) 208 configured for communicating through the front end fabric 104. As such, the NIC 208 is configured to communicate using an RDMA transport.

The memory 210 may store all or portions of one or more programs and/or data to implement aspects of the remote host 102 described herein. The memory 210 can include one or more of random access memory (RAM), read only memory (ROM), magnetic read/write memory, FLASH memory, solid state memory, or the like as well as combinations thereof. The memory 210 can store an operating system (OS) 212, buffers 218 (sometimes referred to as remote buffers 218), scatter gather lists (SGLs) 220, and queues 222. The OS 212 can include an NVM stack 214 and an RDMA stack 216. Applications can interact with the OS 212 and use the NVM stack 214 to read data from or write data to the target system 150. In an example, the NVM stack 214 complies with an NVMe specification and supports some necessary NVMe commands to implement the controller solution. The NVM stack 214 can interact with the RDMA stack 216 to layer NVMe commands over an RDMA transport for communication to the target system 150 over the front end fabric 104. The memory 210 can store various queues 222. The RDMA stack 216 can maintain RDMA queue pairs (QPs) 224. The NVM stack 214 can maintain NVM QPs 226. Notably, the NVM QPs 226 can include one or more pairs of submission queues and completion queues to store entries indicating submission and completion of issued commands. The NVMe commands can reference SGLs 220, which in turn reference the buffers 218. The RDMA stack 216 reads data to and from the buffers 218 using RDMA transactions.

Figure 3:
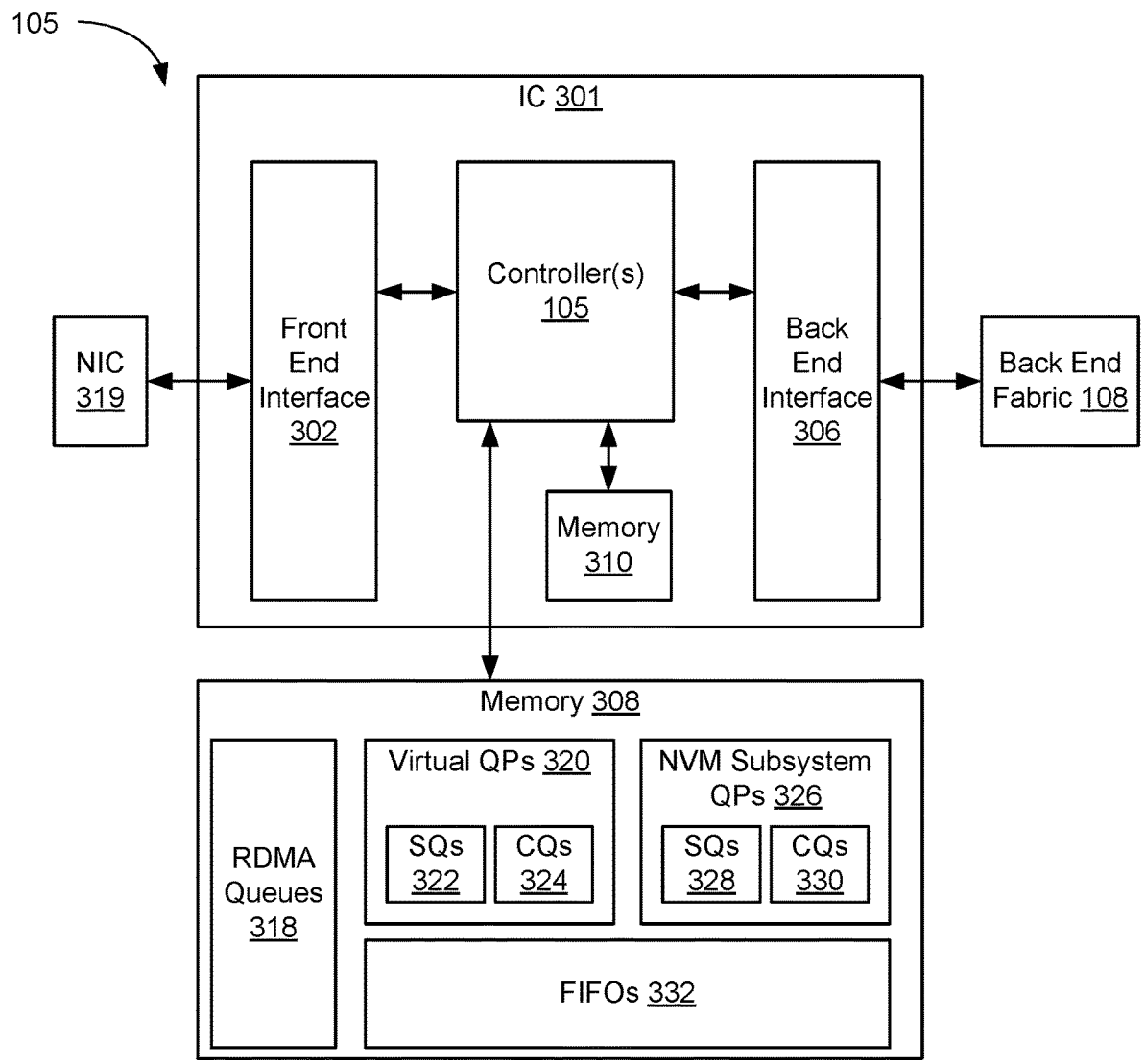
FIG. 3 is a block diagram depicting a target system according to an example.

FIG. 3 is a block diagram depicting a portion of the target system 150 according to an example. The target system 150 includes an integrated circuit (IC) 301. In an example, the IC 301 is a programmable IC, such as a field programmable gate array (FPGA). Alternatively, the IC 301 can be an application specific integrated circuit (ASIC). The IC 301 includes a front-end interface 302, the controller 105, and a back-end interface 306. Although the IC 301 is shown as having a single controller 105, the IC 301 can include more than one controller 105. The front-end interface 302 can be coupled to a NIC 319, which is turn is coupled to the front-end fabric 104. In the example shown, the NIC 319 is external to the IC 301. In other examples, the NIC 319 can be implemented within the IC 301. The back-end interface 306 is configured for communication with one or more NVM subsystems 110 through the back-end fabric 108. For example, the back-end interface 306 can be a PCIe fabric port. The controller 105 can interface with a memory 308 external to the IC 301. In some examples, the controller 105 can also interface with a memory 310 implemented within the IC 301 in addition to the memory 308.

The controller 105 provides an interface between the remote hosts 102 coupled to the front-end fabric 104 and the NVM subsystem 110 coupled to the back-end fabric 108. The controller 105 provides virtual submission and completion queues for the remote hosts 102. The virtual queues are backed by a single shared memory. The controller 105 also provides for flow control to control access among the remote hosts 102 to the limited resources of the shared memory. In this manner, the controller 105 can support a large number of remote hosts given limited memory resources.

The memory 308 stores RDMA queues 318, virtual QPs 320, NVM subsystem QPs 326, and first-in-first-out (FIFO) buffers (FIFOs 332). In operation, the controller 105 stores RDMA instructions received from the local hosts 102, and RDMA instructions to be sent to the local hosts 102, in the RDMA queues 318. The controller 105 extracts NVMe commands from RDMA instructions received from the local hosts 102. The controller 105 maintains at least one virtual QP 320 for each of the local hosts 102. Each virtual QP 320 includes a submission queue (SQ) 322 and a completion queue (CQ) 324. The virtual QPs 320 are virtual in that they do not store the actual NVMe command data. Rather, the virtual QPs 320 store queue attributes that describe virtual queues backed by the FIFOs 332. The queue attributes can include, for example, head pointers and tail pointers that specify the heads and tails of the virtual queues.

The actual data for the virtual queues are stored in the FIFOs 332. The controller 105 stores the commands in a FIFO 332. As the commands are received and stored in the FIFO 332, the controller 105 updates the corresponding SQs 322 when inserting commands (e.g., adjusts tail pointers). The NVM subsystem 110 consumes commands from the FIFO 332 (e.g., on a first-in-first out basis). The controller 105 also updates the corresponding SQs 322 when commands are consumed (e.g., adjusts head pointers). The controller 105 also maintains completion data in a FIFO 332. The controller 105 stores completion data from the NVM subsystem 110 in the FIFO 332 and updates the corresponding CQs 324 (e.g., adjusts tail pointers). The controller 105 also updates the corresponding CQs 324 when completion data is consumed and sent to the remote hosts 102 (e.g., adjusts head pointers).

The NVM subsystem 110 can maintain SQs 328 and CQs 330 in the memory 308. Commands consumed from the FIFOs 332 can be inserted into the SQs 328. Completion data can be inserted into the CQs 330 upon completion. Completion data can be consumed from the CQs 330 and inserted into the FIFOs 332. As opposes to the SQs 322 and the CQs 324 of the virtual QPs 320, the SQs 328 and the CQs 330 can be non-virtual queues that store command and completion data.

The controller 105 also implements flow control for commands from the remote hosts 102. The controller 105 sends advertised queue attributes indicative of projected capacities of the SQs 322 to the remote hosts 102. For example, the controller 105 can send the head and tail pointers of the SQs to the remote hosts 102, which the remote hosts 102 can use to determine the current submission queue capacity. The aggregate of the projected capacities can be larger than the capacity of the FIFOs 332. The controller 105 can monitor the free space of the FIFOs 332. The controller 105 compares the free space against a threshold. Once the amount of free space satisfies the threshold, the controller 105 modifies the advertised queue attributes to reduce the projected capacities. In this manner, the controller 105 can provide backpressure on the remote hosts 102 to conserve the resources of the FIFOs 332.

Figure 4:
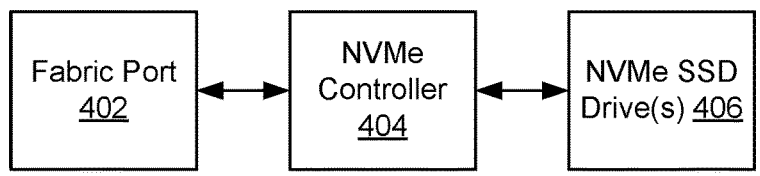
FIG. 4 is a block diagram depicting a nonvolatile memory (NVM) subsystem according to an example.

FIG. 4 is a block diagram depicting an NVM subsystem 110 according to an example. The NVM subsystem 110 includes a fabric port 402, an NVMe controller 404, and one or more NVMe SSD devices 406. The fabric port 402 provides an interface between the NVMe controller 404 and the back-end fabric 108. For example, the fabric port 402 can be a PCIe port. The NVMe controller 404 implements an NVMe register interface for the NVMe SSD devices 406.

The NVMe SSD controller 404 processes the various NVMe commands, such as read commands, write commands, and the like. The NVMe SSD controller 404 consumes the SGLs 312 when executing the commands to perform DMA transactions with the controller 105.

Figure 5:
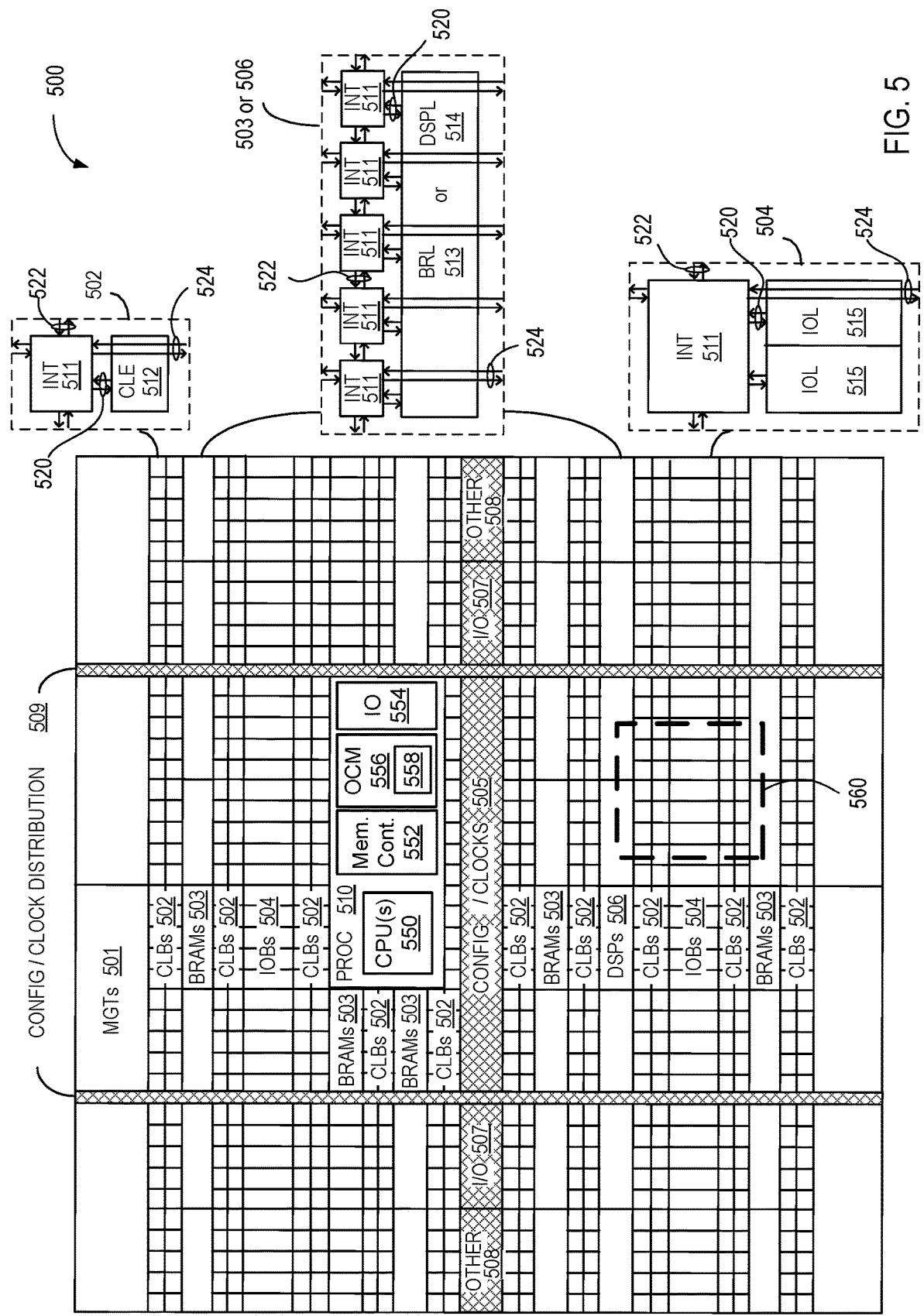
FIG. 5 illustrates an example architecture of a field programmable gate array (FPGA).

FIG. 5 illustrates an example architecture of an FPGA 500 that includes a large number of different programmable tiles including multi-gigabit transceivers ("MGTs") 501, configurable logic blocks ("CLBs") 502, random access memory blocks ("BRAMs") 503, input/output blocks ("IOBs") 504, configuration and clocking logic ("CONFIG/CLOCKS") 505, digital signal processing blocks ("DSPs") 506, specialized input/output blocks ("I/O") 507 (e.g., configuration ports and clock ports), and other programmable logic 508, such as digital clock managers, analog-to-digital converters, system monitoring logic, and so forth. Some FPGAs also include processing system ("PROC") 510.

In some FPGAs, each programmable tile can include at least one programmable interconnect element ("INT") 511 having connections to input and output terminals 520 of a programmable logic element within the same tile, as shown by examples included at the top of FIG. 5. Each programmable interconnect element 511 (also referred to as "interconnect element 511") can also include connections to interconnect segments 522 of adjacent programmable interconnect element(s) in the same tile or other tile(s). Each programmable interconnect element 511 can also include connections to interconnect segments 524 of general routing resources between logic blocks (not shown). The general routing resources can include routing channels between logic blocks (not shown) comprising tracks of interconnect segments (e.g., interconnect segments 524) and switch blocks (not shown) for connecting interconnect segments. The interconnect segments of the general routing resources (e.g., interconnect segments 524) can span one or more logic blocks. The programmable interconnect elements 511 taken together with the general routing resources implement a programmable interconnect structure ("programmable interconnect") for the illustrated FPGA.

In an example implementation, a CLB 502 can include a configurable logic element ("CLE") 512 that can be programmed to implement user logic plus a single programmable interconnect element ("INT") 511. A BRAM 503 can include a BRAM logic element ("BRL") 513 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 506 can include a DSP logic element ("DSPL") 514 in addition to an appropriate number of programmable interconnect elements. An IOB 504 can include, for example, two instances of an input/output logic element ("IOL") 515 in addition to one instance of the programmable interconnect element 511. As will be clear to those of skill in the art, the actual I/O pads connected, for example, to the 1/O logic element 515 typically are not confined to the area of the input/output logic element 515.

In the pictured example, a horizontal area near the center of the die (shown in FIG. 5) is used for configuration, clock, and other control logic. Vertical columns 509 extending from this horizontal area or column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, processor block 510 spans several columns of CLBs and BRAMs. The processing system 510 can include various components ranging from a single microprocessor to a complete programmable processing system of microprocessor(s), memory controllers, peripherals, and the like. For example, the processing system 510 can include one or more CPUs 550, a memory controller 552, on-chip memory (OCM) 556, and IO 554, among other components.

Note that FIG. 5 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 5 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In an example, the IC 301 comprises a programmable IC having an architecture the same as or similar to the FPGA 500. The front-end interface 302, the controller 105, the back-end interface 306, and the memory 310 can be implemented within the FPGA 500. The front-end interface 302 and the back-end interface 306 can be implemented using IO in the FPGA 500, such as IO 554, MGTs 501, IOBs 504, or a combination thereof. The controller 105 can be implemented using software 558 stored in the OCM 556 configured for execution by the CPU(s) 550. Alternatively, the controller 105 can be implemented by a controller circuit 560 configured within the programmable fabric of the FPGA 500. In yet another alternative, the controller 105 can be implemented using a combination of software 558 and circuitry 560.

Figure 6:
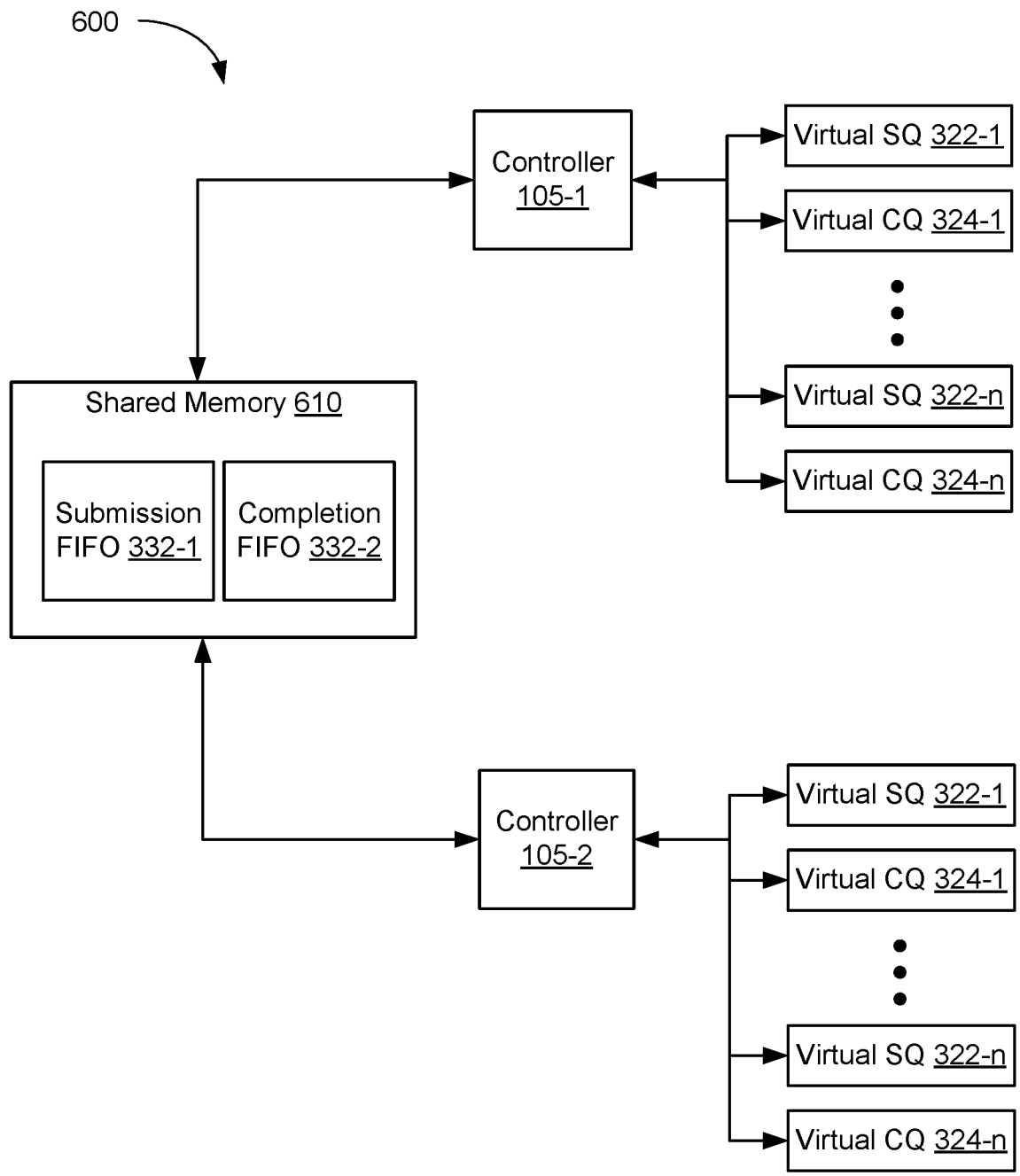
FIG. 6 is a block diagram depicting the structure of the data maintained by a controller according to an example.

FIG. 6 is a block diagram depicting the structure of the data maintained by the controllers 105 according to an example. In the present example, the target system 150 includes two controllers 105-1 and 105-2. It is to be understood that the target system 150 can include more than two controllers 105 or a single controller 105. Each controller 105 maintains at least one virtual queue pair for each remote host 102. In the present example, each controller 105 maintains a single virtual queue pair for each of n remote hosts 102, where n is an integer greater than one. In the example, each controller 105 maintains a virtual SQ 322-1 and a virtual CQ 324-1 for a remote host 102-1 and so on up to a virtual SQ 322-n and a virtual CQ 324-n for a remote host 102-n. As described above, each virtual SQ 322 comprises queue attributes (e.g., head and tail pointers) that define a virtual submission queue for a respective one of the remote hosts 102. Likewise, each virtual CQ 324 comprises queue attributes (e.g., head and tail pointers) that define a virtual completion queue for a respective one of the remote hosts 102. The virtual SQs 322 and the virtual CQs 324 do not store the command/completion data. The queue attributes of the virtual SQs 322 and the virtual CQs 324 can be used to determine a current capacity of the respective queues.

Each controller 105 stores incoming commands in a submission FIFO 332-1 that is shared among all of the remote hosts 102. Each controller 105 stores completion data in a completion FIFO 332-2 that is shared among all of the remote hosts 102. The submission FIFO 332-1 and the completion FIFO 332-2 comprise a shared memory 610 (e.g., a shared portion of the memory 308). In an example, the entries in the FIFOs 332-1 and 332-2 comprise a host identifier field, a queue identifier field, a slot number field, and a queue entry field. The host identifier field identifies the remote host issuing the command. The queue identifier field identifies the virtual queue. The slot number identifies the slot in the FIFO. The queue entry field includes the command or completion data.

Figure 7:
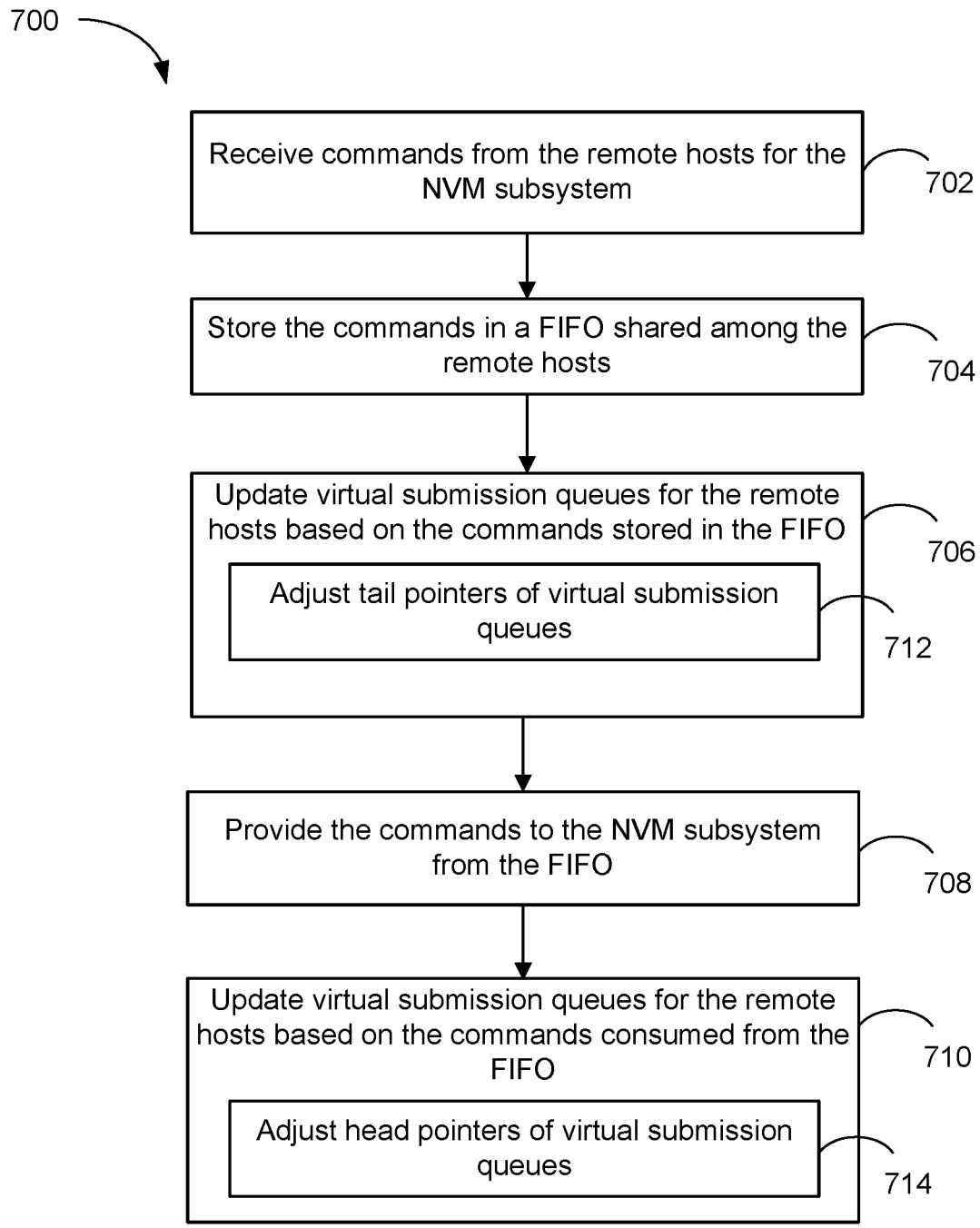
FIG. 7 is a flow diagram depicting a method of processing NVMe commands according to an example.

FIG. 7 is a flow diagram depicting a method 700 of processing NVMe commands according to an example. The method 700 is performed by the controller 105. The method 700 begins at step 702, where the controller 105 receives commands from the remote hosts for the NVM subsystem 110 (e.g., NVM commands embedded in RDMA instructions). At step 704, the controller 105 stores the commands in the submission FIFO 332-1 that is shared among the remote hosts 102. At step 706, the controller 105 updates the virtual SQs 322 for the remote hosts 102 based on the commands stored in the submission FIFO 332-1. For example, at step 712, the controller 105 can adjust tail pointers of the virtual SQs 322.

At step 708, the controller 105 provides the commands to the NVM subsystem 110 from the submission FIFO 332-1. At step 710, the controller 105 updates the virtual SQs 322 for the remote hosts 102 based on the commands consumed from the submission FIFO 332-1. For example, at step 714, the controller 105 can adjust head pointers of the virtual SQs 322.

Figure 8:
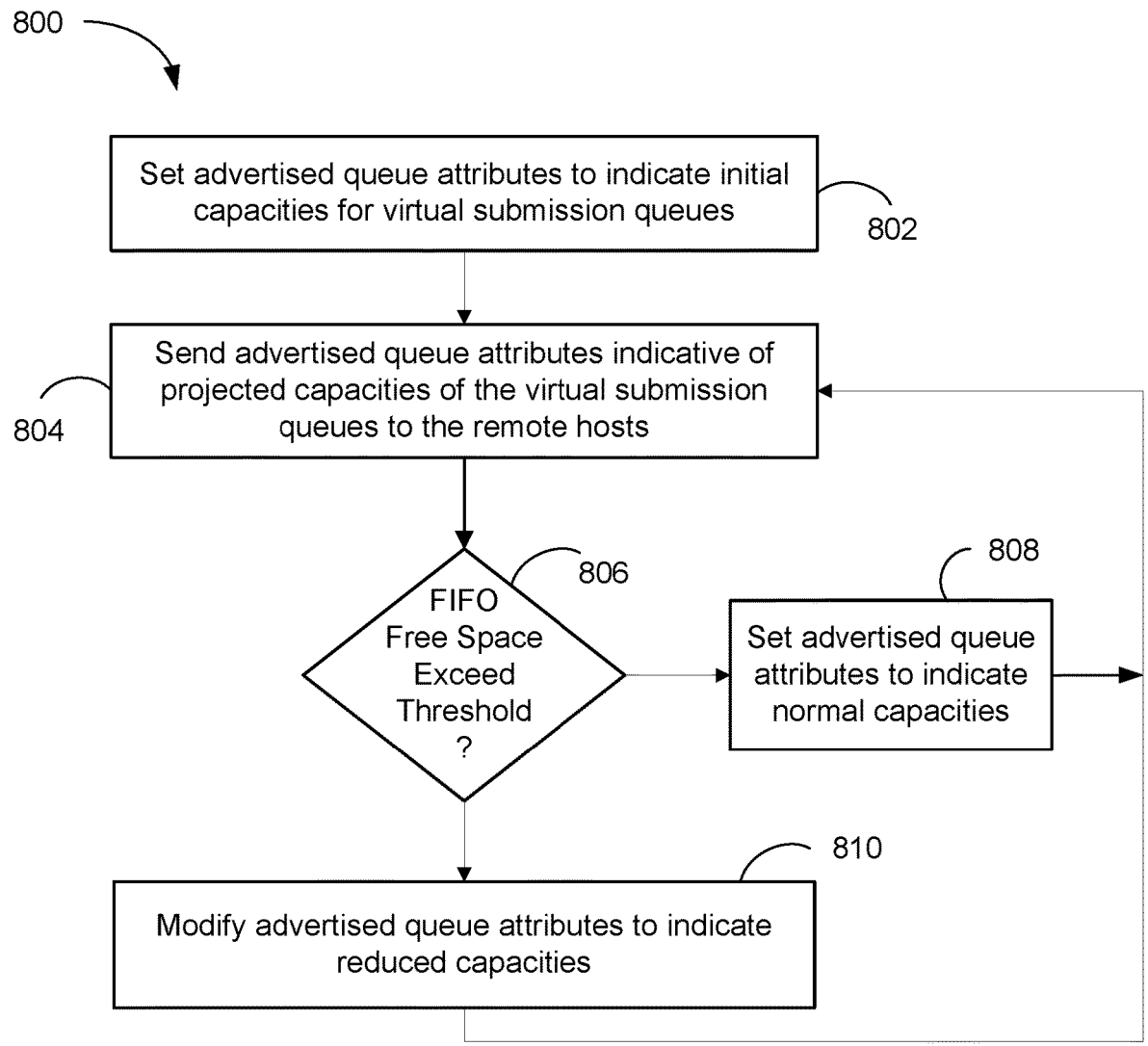
FIG. 8 is a flow diagram depicting a method of flow control according to an example.

FIG. 8 is a flow diagram depicting a method 800 of flow control according to an example. The method 800 can be performed by the controller 105. At step 802, the controller 105 sets advertised queue attributes to indicate initial capacities for the virtual SQs 322. In an example, the aggregate of the projected capacities is more than the capacity of the submission FIFO 332-1. At step 804, the controller 105 sends the advertised queue attributes indicative of the projected capacities of the virtual SQs 322 to the remote hosts 102. For example, the controller 105 can send head and tail pointers for the virtual SQs 322 to the remote hosts 102.

At step 806, the controller 105 determines if the free space in the submission FIFO 332-1 satisfies a threshold. If so, the method 800 proceeds to step 810. At step 810, the controller 105 modifies the advertised queue attributes to indicate reduced capacities. In this manner, the controller 105 exerts backpressure on the remote hosts 102 to constrain the incoming commands so as to not overflow the submission FIFO 332-1. The controller 105 can modify the head pointers so that a smaller than normal capacity is advertised. In an example, the controller 105 can compute an average or weighted number of entries in the submission FIFO 332-1 per remote host and then determine the capacities of the virtual SQs 322 based thereon.

If at step 806 the free space in the submission FIFO 332-1 does not satisfy the threshold, the method 800 proceeds to step 808, where the controller 105 sets the advertised queue attributes to indicate normal capacities. In an example, an aggregate of the normal capacities can exceed the total capacity of the submission FIFO 332-1. The method 800 returns to step 804 from steps 808 and 810.

Figure 9:
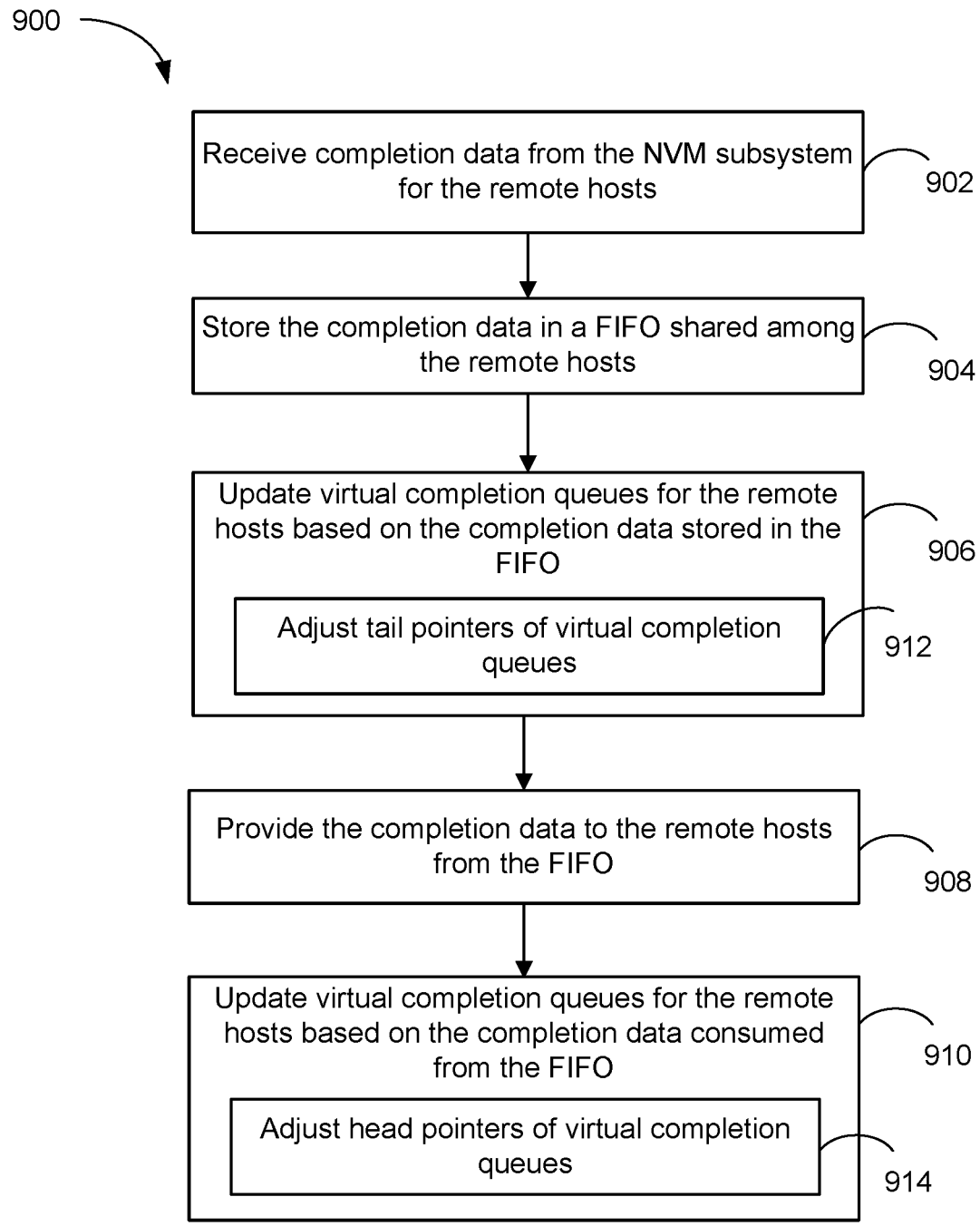
FIG. 9 is a flow diagram depicting a method of processing NVMe completion data according to an example.

FIG. 9 is a flow diagram depicting a method 900 of processing NVMe completion data according to an example. The method 900 is performed by the controller 105. The method 900 begins at step 902, where the controller 105 receives completion data from the NVM subsystem 110 for the remote hosts 102. At step 904, the controller 105 stores the completion data in the completion FIFO 332-2 that is shared among the remote hosts 102. At step 906, the controller 105 updates the virtual CQs 324 for the remote hosts 102 based on the commands stored in the completion FIFO 332-2. For example, at step 912, the controller 105 can adjust tail pointers of the virtual CQs 324.

At step 908, the controller 105 provides the commands to the remote hosts 102 from the completion FIFO 332-2. At step 910, the controller 105 updates the virtual CQs 324 for the remote hosts 102 based on the completion data consumed from the completion FIFO 332-2. For example, at step 914, the controller 105 can adjust head pointers of the virtual CQs 324.

While the foregoing is directed to specific examples, other and further examples may be devised without departing from the basic scope thereof, and the scope thereof is determined by the claims that follow.

What is claimed is:

1. A method of flow control, the method comprising:
receiving, by a nonvolatile memory express over fabric (NVMEoF) controller of a target system, commands for at least two NVM subsystems of a plurality of nonvolatile memory (NVM) subsystems of the target system from at least two remote hosts coupled to the target system over a front-end fabric, the plurality of NVM subsystems coupled to the NVMEoF controller over a back end fabric of the target system, the front-end fabric having a first transport and the back end fabric having a second transport different than the first transport, none of the at least two remote hosts co-locational with the target system;
storing the commands in a first buffer implemented in memory of the target system; and
updating a first virtual submission queue associated with a first one of the at least two remote hosts and a second virtual submission queue associated with a second one of the at least two remote hosts based on the commands stored in the first buffer.

2. The method of claim 1, wherein each of the first and second virtual submission queues is specified by a plurality of queue attributes.

3. The method of claim 2, wherein the plurality of queue attributes for each of the first and second virtual submission queues comprises a queue head pointer and a queue tail pointer.

4. The method of claim 1, wherein the first buffer includes a plurality of slots each comprising a host identifier field, a queue identifier field, a slot number field, and a queue entry field.

5. The method of claim 1, further comprising:
sending advertised queue attributes indicative of projected capacities of the first and second virtual submission queues from the target system to the at least two remote hosts, an aggregate of the projected capacities being more than a capacity of the first buffer.

6. The method of claim 5, further comprising:
comparing free space in the first buffer against a threshold; and
modifying the advertised queue attributes to reduce the projected capacities in response to the free space satisfying the threshold.

7. The method of claim 5, wherein the advertised queue attributes comprise queue head pointers for each of the first and second virtual submission queues.

8. The method of claim 5, wherein the advertised queue attributes are provided in completion queue entries for completion queues of the at least two remote hosts.

9. The method of claim 1, wherein the first buffer is a submission buffer, and wherein the method further comprises:
receiving completion data from the NVM subsystems at the NVMEoF controller for the at least two remote hosts;
storing the completion data in a completion buffer shared among the at least two remote hosts and implemented in the memory of the target system;
updating virtual completion queues for the at least two remote hosts based on the completion data stored in the first buffer; and
providing the completion data to the remote hosts from the first buffer.

10. The method of claim 9, wherein the completion buffer includes a plurality of slots each comprising a host identifier field, a queue identifier field, a slot number field, and a queue entry field.

11. An integrated circuit (IC), comprising:
a front-end interface configured for communication with at least two remote hosts over a front-end fabric having a first transport;
a back-end interface configured for communication with at least two nonvolatile memory (NVM) subsystems over a back-end fabric having a second transport that is different than the first transport; and
a nonvolatile memory express over fabric (NVMEoF) controller coupled between the front-end interface and the back-end interface, the NVMEoF controller configured to:
receive commands for the NVM subsystems from the remote hosts for the NVM subsystems over the front-end fabric, wherein none of the at least two remote hosts are co-locational with either the NVMEoF controller or the NVM subsystems;
store the commands in a first buffer implemented in a memory coupled to the NVMEoF controller;
update a first virtual submission queue associated with a first one the at least two remote hosts and a second virtual submission queue associated with a second one of the at least two remote hosts based on the commands stored in the first buffer; and
provide the commands to the NVM subsystems from the first buffer.

12. The IC of claim 11, wherein each of the first and second virtual submission queues is specified by a plurality of queue attributes, and wherein the plurality of queue attributes for each of the first and second virtual submission queues comprises a queue head pointer and a queue tail pointer.

13. The IC of claim 11, wherein the NVMEoF controller is configured to send advertised queue attributes indicative of projected capacities of the first and second virtual submission queues to the remote hosts, an aggregate of the projected capacities being more than a capacity of the first buffer.

14. The IC of claim 13, wherein the NVMEoF controller is configured to:
compare free space in the first buffer against a threshold; and
modify the advertised queue attributes to reduce the projected capacities in response to the free space satisfying the threshold.

15. The IC of claim 11, wherein the first buffer is a submission buffer, and wherein the NVMEoF controller is configured to:
receive completion data from the NVM subsystems for the remote hosts;

store the completion data in a completion buffer shared among the remote hosts and implemented in the memory coupled to the NVMEoF controller;
update virtual completion queues for the remote hosts based on the completion data stored in the first buffer; and
provide the completion data to the remote hosts from the first buffer.

16. A computer system, comprising:
a plurality of remote hosts;
a front-end fabric;
a target system coupled to the plurality of remote hosts through the front-end fabric and configured to communicate with the plurality of remote hosts using a remote direct memory access (RDMA) transport;
a back-end fabric;
a nonvolatile memory (NVM) subsystem coupled to the back-end fabric and configured to communicate using a transport different than the RDMA transport; and
a controller disposed in the target system configured to:
  receive commands from the plurality of remote hosts for the NVM subsystem;
  store the commands in a first buffer shared among the plurality of remote hosts and implemented in a memory coupled to the controller;
  update virtual submission queues for the plurality of remote hosts based on the commands stored in the first buffer, wherein each of the virtual submission queues is associated with a respective one of the plurality of remote hosts;
  provide the commands to the NVM subsystem from the first buffer;
  send advertised queue attributes indicative of projected capacities of the virtual submission queues to the plurality of remote hosts, an aggregate of the projected capacities being more than a capacity of the first buffer;
  compare free space in the first buffer against a threshold; and
  modify the advertised queue attributes to reduce the projected capacities in response to the free space satisfying the threshold.

17. The computer system of claim 16, wherein each of the virtual submission queues is specified by a plurality of queue attributes, and wherein the plurality of queue attributes for each of the virtual submission queues comprises a queue head pointer and a queue tail pointer.

18. The computer system of claim 16, wherein the first buffer is a submission buffer, and wherein the controller is configured to:
  receive completion data from the NVM subsystem for the plurality of remote hosts;
  store the completion data in a completion buffer shared among the plurality of remote hosts and implemented in the memory coupled to the controller;
  update virtual completion queues for the plurality of remote hosts based on the completion data stored in the first buffer, wherein each of the virtual completion queues is associated with a respective one of the plurality of remote hosts; and
  provide the completion data to the plurality of remote hosts from the first buffer.

19. The computer system of claim 16, wherein at least one of the advertised queue attributes comprise queue head pointers for each of the virtual submission queues, and the advertised queue attributes are provided in completion queue entries for completion queues of the plurality of remote hosts.

20. The method of claim 1, wherein:
the first virtual submission queue is a first one of a plurality of virtual queue pairs, and the second virtual submission queue is a second one of the plurality of virtual queue pairs;
each of the plurality of virtual queue pairs includes a respective virtual submission queue and a respective virtual completion queue comprising queue head pointers and a queue tail pointers that associate each of the virtual queue pairs with a respective one of the at least two remote hosts;
the queue head pointers and queue tail pointers of each of the virtual completion queues and the virtual submission queues are updated based on the commands stored within the first buffer and remotely from the virtual completion queues and the virtual submission queues; and
the commands are consumed by the plurality of NVM subsystems from the first buffer.

* * * * *